(12) United States Patent  (10) Patent No.: US 8,364,490 B2
Creamer et al.  (45) Date of Patent: *Jan. 29, 2013

(54) VOICE BROWSER WITH INTEGRATED TCAP AND ISUP INTERFACES

(75) Inventors: Thomas E. Creamer, Boca Raton, FL (US); Victor S. Moore, Lake City, FL (US); Glen R. Walters, Hollywood, FL (US); Scott Lee Winters, Austin, TX (US)

(73) Assignee: Nuance Communications, Inc., Burlington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/881,369

(22) Filed: Sep. 14, 2010

(65) Prior Publication Data

US 2011/0002449 A1   Jan. 6, 2011

Related U.S. Application Data

(63) Continuation of application No. 10/172,280, filed on Jun. 14, 2002, now Pat. No. 7,822,609.

(51) Int. Cl.
    *G10L 21/00* (2006.01)
(52) U.S. Cl. ............... 704/270.1; 740/270; 740/275
(58) Field of Classification Search ............... None
    See application file for complete search history.

(56) References Cited

U.S. PATENT DOCUMENTS

| | | |
|---|---|---|
| 5,583,976 A | 12/1996 | Bullard, Jr. |
| 5,602,909 A | 2/1997 | Carkner et al. |
| 5,610,977 A | 3/1997 | Williams et al. |
| 5,974,128 A | 10/1999 | Urban et al. |
| 6,011,844 A | 1/2000 | Uppaluru et al. |
| 6,018,710 A | 1/2000 | Wynblatt et al. |
| 6,085,161 A | 7/2000 | MacKenty et al. |
| 6,101,494 A | 8/2000 | Khosravi-Sichani et al. |
| 6,141,545 A | 10/2000 | Begeja et al. |
| 6,173,316 B1 | 1/2001 | De Boor et al. |
| 6,203,495 B1 | 3/2001 | Bardy |
| 6,208,642 B1 | 3/2001 | Balachandran et al. |
| 6,236,722 B1 | 5/2001 | Gilbert et al. |
| 6,261,230 B1 | 7/2001 | Bardy |
| 6,263,051 B1 | 7/2001 | Saylor et al. |
| 6,604,075 B1 | 8/2003 | Brown et al. |
| 6,622,016 B1 | 9/2003 | Sladek et al. |
| 6,654,722 B1 * | 11/2003 | Aldous et al. .............. 704/270.1 |

(Continued)

FOREIGN PATENT DOCUMENTS

| | | |
|---|---|---|
| JP | 11-046375 | 2/1999 |
| JP | 2001-339512 | 12/2001 |

(Continued)

OTHER PUBLICATIONS

Hamilton, G., "Java Beans", Sun Miccrosystems, Aug. 8, 1997.

(Continued)

*Primary Examiner* — Leonard Saint Cyr
(74) *Attorney, Agent, or Firm* — Wolf, Greenfield & Sacks, P.C.

(57) ABSTRACT

A voice browser configured to process voice markup language documents can include a voice processing application and an integrated communications interface for interacting with a voice processing system. The voice browser can be configured to load the voice processing application independently of a received telephone call. The integrated communications interface can include at least one of an integrated transaction capabilities application part component for receiving a transaction capabilities application part query and an integrated ISUP component for receiving a telephony control signal.

8 Claims, 1 Drawing Sheet

U.S. PATENT DOCUMENTS

| | | | |
|---|---|---|---|
| 6,707,811 B2 * | 3/2004 | Greenberg et al. | 370/352 |
| 6,707,889 B1 | 3/2004 | Saylor et al. | |
| 6,721,705 B2 * | 4/2004 | Kurganov et al. | 704/270.1 |
| 6,857,008 B1 | 2/2005 | Shenefiel | |
| 7,072,328 B2 | 7/2006 | Shen et al. | |
| 7,171,361 B2 | 1/2007 | Thomas et al. | |
| 2002/0006124 A1 * | 1/2002 | Jimenez et al. | 370/352 |
| 2002/0128845 A1 | 9/2002 | Thomas et al. | |
| 2002/0154646 A1 | 10/2002 | Dubois et al. | |
| 2003/0233239 A1 | 12/2003 | Creamer et al. | |

FOREIGN PATENT DOCUMENTS

| | | |
|---|---|---|
| JP | 2001 527354 | 12/2001 |
| JP | 2002 135418 | 5/2002 |
| JP | 2002 135462 | 5/2002 |
| JP | 2002 165013 | 6/2002 |
| KR | 1020000057185 A | 9/2000 |
| WO | WO 98/37688 A3 | 8/1998 |
| WO | WO 00/21073 B1 | 4/2000 |

OTHER PUBLICATIONS

Office Action dated Jul. 15, 2009 from Japanese Application No. 2004-514319.

* cited by examiner

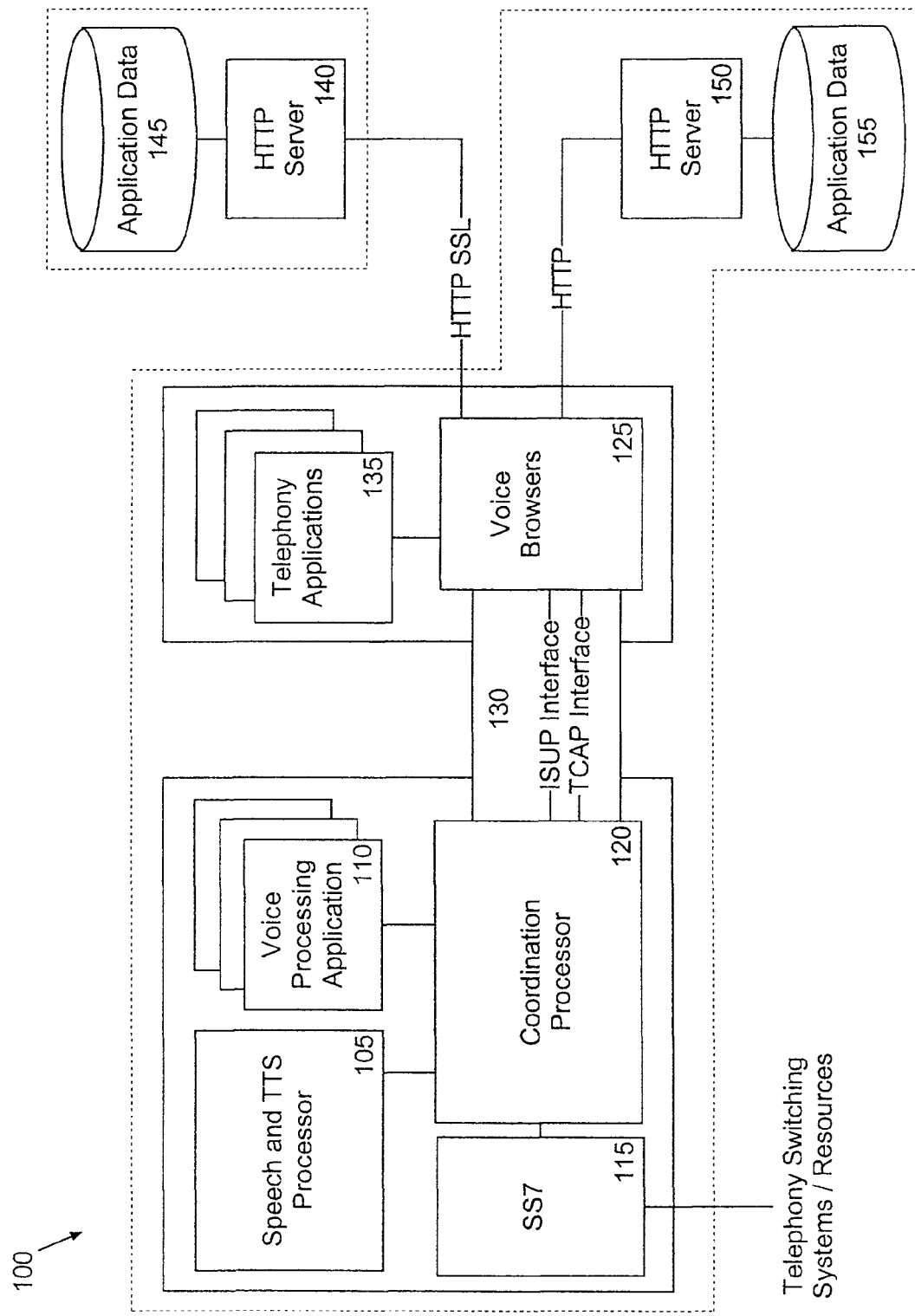

VOICE BROWSER WITH INTEGRATED TCAP AND ISUP INTERFACES

CROSS REFERENCE TO RELATED APPLICATION

This application is a continuation of pending application Ser. No. 10/172,280, entitled "VOICE BROWSER WITH INTEGRATED TCAP AND ISUP INTERFACES", filed Jun. 14, 2002 under Attorney Docket No. N0484.70552US00, which is hereby incorporated by reference in its entirety.

BACKGROUND OF THE INVENTION

1. Technical Field

The invention relates to the field of telephony and, more particularly, to the field of voice browsers.

2. Description of the Related Art

Voice browser technology is used to develop interactive telephony services. For example, interactive voice response units, referred to as IVRs, can be implemented with a voice browser and one or more voice markup language modules referred to as voicelets. When a telephone call is received, the telephone call can be routed to a voice browser. The voice browser can answer the telephone call, and after answering the telephone call, can load a voicelet to process the telephone call.

Conventional voice browsers, however, must answer a received telephone call prior to launching a voicelet within the voice browser. As such, conventional voice browser technology precludes the implementation of any service applications which can run independently of a received call or that must be loaded prior to receiving or answering an incoming call. Thus, for example, service applications such as "800" number translation, calling name delivery, and local number portability, which require a voicelet to be launched prior to answering a call cannot be implemented using conventional voice browser technology.

SUMMARY OF THE INVENTION

The invention disclosed herein provides for a class of telephony applications which can be loaded within a voice browser independently of whether a telephone call is received by the voice browser. In one aspect of the invention, a voice browser is disclosed which can include a telephony application, and an integrated communications interface for interacting with a voice processing system. The telephony application, for example, can be configured to perform any of a variety of telephony services such as number translation, calling name delivery, and/or local number portability. Notably, the voice browser can be configured to load the telephony application independently of a received telephone call.

The integrated communications interface can include at least one of an integrated transaction capabilities application part (TCAP) component for sending and receiving a TCAP query and an integrated ISDN user part (ISUP) component for sending and receiving a telephony control signal. The TCAP and ISUP interfaces can be software components such as Java beans or beans which are compatible with Java beans. The voice processing application can include an object tag for referencing the integrated communications interface.

Another aspect of the present invention can include a voice processing system. The voice processing system can include a speech and text-to-speech processor, at least one voice processing application, and a coordination processor configured to coordinate the operation of the speech and text-to-speech processor and the voice processing applications. The voice processing system further can include a plurality of active voice browsers. Each of the active voice browsers can communicate with the coordination processor through a communications interface included therein. The communications interface can include at least one of an integrated TCAP component for sending and receiving a TCAP query and an integrated ISUP component for sending and receiving a telephony control signal. The TCAP and ISUP interfaces can be software components, for example Java beans or beans compatible with Java beans.

The voice processing system can include a telephony application to be loaded within one of the voice browsers independently of a received telephone call. For example, an active voice browser can load the telephony application for performing a telephony service such as number translation, calling name delivery, and/or local number portability.

Another aspect of the present invention can include a method of managing voice browser applications in a telephony voice processing system. The method can include allocating one or more active voice browsers. Each of the voice browsers can include at least one of a TCAP interface for sending and receiving a TCAP query and an integrated ISUP interface for sending and receiving a telephony control signal. Although telephony applications can be loaded responsive to answering a telephone call, the method can include loading, within one of the active voice browsers, a telephony application independently of whether the voice browser receives a telephone call. For example, a telephony application can be loaded responsive to receiving a TCAP query, an ISUP telephony control signal, and/or a telephone call. Notably, the telephony application can be loaded responsive to receiving a telephone call, but prior to answering the telephone call. The telephony applications can be loaded for performing telephony services such as number translation, calling name delivery, and local number portability.

BRIEF DESCRIPTION OF THE DRAWINGS

There are shown in the drawings embodiments which are presently preferred, it being understood, however, that the invention is not limited to the precise arrangements and instrumentalities shown.

FIG. 1 is a schematic diagram of a voice processing system in accordance with the inventive arrangements disclosed herein.

DETAILED DESCRIPTION OF THE INVENTION

The invention disclosed herein provides for a class of telephony applications which can be loaded within a voice browser independently of whether a telephone call is received by the voice browser. In particular, the invention provides a voice browser which can be configured with an integrated communications interface having a transaction capabilities application part (TCAP) component and an ISDN user part (ISUP) component, thereby allowing the voice browser to receive TCAP queries and ISUP control signals. Moreover, the integrated communications interface enables telephony applications executing within the voice browser to access TCAP and ISUP based services through the voice browser.

FIG. 1 is a schematic diagram illustrating a voice processing system 100 in accordance with the inventive arrangements disclosed herein. As shown in FIG. 1, system 100 can include a speech and text-to-speech (TTS) processor 105, one or more voice processing applications 110, and a Signaling System 7 (SS7) interface 115. Each of the speech and textto-speech processor 105, the voice processing applications 110, and the SS7 interface 115 can be communicatively linked through a coordination processor 120. The coordination processor 120 further can coordinate the interaction between the various components of system 100.

The coordination processor 120 can be communicatively linked to one or more voice browsers 125 through an interface 130. The voice browsers 125 can be configured to include an integrated communications interface having a TCAP component and an ISUP component, and can access and load any of a variety of telephony applications 135. The voice browsers 125 further can be communicatively linked to one or more HTTP servers 140 and 150. Each of the HTTP servers 140 and 150 can be communicatively linked to one or more application data stores 145 and 155 respectively.

The speech and TTS processor 105 can be configured to convert digitized speech to text. For example, the speech and TTS processor 105 can perform an acoustic analysis upon digitized speech to identify one or more potential text or word candidates as well as perform a contextual or linguistic analysis upon the potential word candidates to determine a final text representation of the digitized speech signal. Additionally, the speech and TTS processor 105 can produce speech from text input and/or pronunciation data through speech synthesis technology, or by playing recorded voice responses and/or selections.

The voice processing applications 110 can be one or more programs or sets of programs which can be written by system operators or administrators. The voice processing applications 110 can include one or more state tables or custom servers running within the voice processing system 100. For example, the voice processing applications 110 can answer calls, make calls, play recorded voice segments, as well as access the various functions of the speech and TTS processor 105 to interact with callers.

The coordination processor 120 can coordinate the operation of the speech and TTS processor 105, the voice processing applications 110, and the SS7 interface, as well as facilitate communications among the aforementioned components of the voice processing system 100. For example, as indicated, the coordination processor 120 can communicate with other telephony switching systems and resources via the SS7 interface 115. The SS7 interface, as is well known in the art, can include TCAP and ISUP communication components. The coordination processor 120 can access the voice processing applications 110 as needed to service incoming calls, place outgoing calls, or provide other telephony services. The coordination processor 110 also can route data between the speech and TTS processor 105 and the voice processing applications 110. Additionally, the coordination processor can include an interface for communicating with the voice browsers 125.

The voice browser 125 can load and execute telephony applications 135. The telephony applications 135 can include voice markup language modules referred to as voicelets, for example Voice Extensible Markup Language (VoiceXML) applications. Accordingly, the telephony applications can produce audio dialogs using synthesized speech and/or digitized audio, recognize dual tone multi-frequency (DTMF) key input, and record spoken input. The foregoing is not an exhaustive listing of telephony application capabilities. The list is provided for purposes of illustration only and is not intended as a limitation on the present invention. Accordingly, those skilled in the art will recognize that the telephony applications 135 can perform any of a variety of functions as specified within the VoiceXML specification as promulgated by the World Wide Web Consortium (W3C).

The voice browser 125 can format HTTP requests and send those requests to one or more HTTP servers 140 and 150. Each of the HTTP servers 140 and 150 can access one or more associated data stores. For example, HTTP server 140 can access the application data store 145; and, HTTP server 150 can access the application data store 155. Notably, as HTTP server 140 is an out of network HTTP server, communications with HTTP server 140 can be facilitated using public and private key encryption and digital certificates. For instance, secure socket layer (SSL) protocol can be used to ensure secure data transmission. In any case, each of the application data stores 145 and 155 can include application data, such as voice markup language application data, and more particularly, VoiceXML application data, which may be required by the telephony applications 135.

The voice browser 125 can be communicatively linked to the coordination processor 120 through an interface 130. The interface 130 can be implemented using a series of software components. More specifically, the voice browser 125 can include an integrated communications interface having a TCAP component and an ISUP component, each of which can be implemented as a software component such as a Java bean or bean which is compatible with Java beans. Through the integrated communications interface, the voice browser 125 can access transaction-oriented applications and functions as well as access procedures, functions, and interexchange signaling information flows required to provide circuit-switched services and associated facilities for voice and non-voice calls over ISDN. Thus, the ISUP component can support the protocols and procedures necessary to setup and manage a call, while the TCAP component can support the exchange of transactional information. Notably, the communications interface can be accessed by telephony applications 135 by including a reference to the interface within the telephony applications 135, for example by using an object attribute in VoiceXML.

In illustration, the voice processing system 100 can allocate one or more voice browsers 125 which remain in an active state. The voice browsers 125, having a TCAP component and an ISUP component integrated therein, can load telephony applications 135 as a result of a received TCAP query or ISUP telephony control signal. Thus, the telephony applications 135 can be loaded before a telephone call is answered by the voice browser, and/or independently of receiving a telephone call. Accordingly, the voice browsers 125 can provide a class of services previously unavailable using voice markup languages such as VoiceXML. For example, through the voice browsers 125 and the telephony applications 135, services such as number translation, calling name delivery, and local number portability can be provided.

Upon receiving a TCAP request, an ISUP control signal, or a telephone call, the voice browser 125 can load an appropriate telephony application 135. The telephony application 135 can access transaction-based features and functions as well as procedures, functions, and interexchange signaling information flows required to provide circuit-switched services and associated facilities for voice and non-voice calls over ISDN. Additionally, the telephony applications 135 can cause the voice browser 125 to format HTTP requests, through a secure connection if necessary, to be sent to the HTTP servers 140 and 150. The HTTP servers can access the requested application data from one of the data stores 145 and/or 155 as the case may be, and provide the requested application data to the appropriate telephony application 135 via the voice browser 125. The telephony application 135s can initiate a transaction-based service via the TCAP component of the integrated communication interface as well as call setup and maintenance, for example, via the ISUP component of the integrated communications interface. For example, a query can be initiated to determine routing instructions for an "800" telephone number. The query can be received by the SS7 interface 115 and provided to the voice browser 125 via the coordination processor 110 and the interface 130. The voice browser 125 can load an appropriate telephony application to process the received request. Additionally, the telephony application 135 can initiate queries to telephony resources or cause the voice browser 125 to send HTTP requests to other HTTP servers.

In another aspect of the invention, an incoming telephone call originating from an external telephony switch can be routed to the voice processing system 100 for processing. The voice processing system can interact with a telephony switch to receive calls via the SS7 interface 115. The received telephone call can be processed as required using the interactive voice response functions provided by the speech and TTS processor 105 and the voice processing applications 110 under the control of the coordination processor 120. Similarly, the received telephone call can be routed to the voice browsers 125. Accordingly, upon receiving the telephone call, but prior to answering, the voice browser 125 can load one of the telephony applications 135 to perform call setup and maintenance and/or transaction based services.

Thus, the invention disclosed herein provides for a class of telephony applications which can be loaded within a voice browser independently of whether a telephone call is received by the voice browser. Because the voice browser includes an integrated communications interface having a TCAP component and an ISUP component, the voice browser can load voice markup language applications responsive to TCAP queries and ISUP telephony control signals.

The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A voice browser comprising:
   one or more telephony applications, including one or more Voice Markup Language modules, and
   an integrated communications interface for interacting with a voice processing system comprising a speech processor, a text-to-speech processor, and/or a voice processing application, said integrated communications interface including an integrated transaction capabilities application part (TCAP) component for sending and receiving a TCAP query and/or an integrated services digital network user part (ISUP) component for sending and receiving a telephony control signal,
   wherein said voice browser is configured to select and load one of the telephony applications, in response to a received TCAP query or a received ISUP control signal, before a telephone call is answered by the voice browser, the selection and loading of the telephony application being performed independently of receiving a telephone call and wherein said voice browser is configured to use the independently selected and loaded telephony application to perform one or more telephony services in responding to a received telephone call.

2. The voice browser of claim 1, wherein the selected telephony application is configured to perform a telephony service selected from the group consisting of number translation, calling name delivery, and local number portability.

3. The voice browser of claim 1, wherein said integrated TCAP component and said integrated ISUP component are software components.

4. The voice browser of claim 3, wherein said software components are Java beans.

5. The voice browser of claim 1, wherein the selected telephony application includes an object tag referencing said integrated communications interface.

6. A voice browser comprising:
   at least one computer system including a processor and a memory, the memory including components for execution by the processor, the components including:
   at least one Voice Markup Language module configured to perform telephony functions, the Voice Markup Language module loaded into the voice processor in response to a received telephone call;
   an integrated communications interface configured to communicate with a voice processing system, the integrated communications interface including an integrated transaction capabilities part (TCAP) interface for sending and receiving a TCAP query and/or an integrated services digital network user part (ISUP) interface for sending and receiving a telephony control signal; and
   at least one telephony application loaded into the voice browser, in response to a TCAP query or a ISUP telephony control signal, before a telephone call is answered by the voice browser, the at least one telephony application being loaded into the voice browser independently of whether the voice browser receives a telephone call, wherein the voice browser is configured to use the independently loaded telephony application to perform one or more telephony services in responding to a received telephone call.

7. A voice browser comprising:
   at least one computer system including a processor and a memory, the memory including computer-executable instructions that, when executed by the processor, are configured to:
   communicate with a voice processing system utilizing an integrated transaction capabilities application part (TCAP) interface for sending and receiving a TCAP query and/or an integrated services digital user part (ISUP) interface for sending and receiving a telephony control signal;
   select one of a plurality of telephony applications responsive to receiving a TCAP query or a ISUP telephony control signal, wherein the telephony application is selected independently of whether the voice browser receives a telephone call;

load, within the voice browser, the selected telephony application, wherein said telephony application is loaded independently of receiving a telephone call; and
select a Voice Markup Language module responsive to receiving a telephone call and load the selected Voice Markup Language module to process the telephone call, the voice browser performing integrated selection and loading of the Voice Markup Language module in response to a telephone call, and the voice browser performing selection and loading of the telephony application within the voice browser, in response to a TCAP query or a ISUP telephony control signal, before a telephone call is answered by the voice browser, the selection and loading of the telephony application being performed independently of whether the voice browser receives a telephone call, wherein the voice browser is configured to use the independently selected and loaded telephony application to perform one or more telephony services in responding to a received telephone call.

8. The voice browser of claim 7, wherein the telephony application is configured to perform a telephony service selected from the group consisting of number translation, calling name delivery, and local number portability.

* * * * *